May 1, 1951     H. J. HERSEY, JR     2,551,126

DUST FILTER

Filed Oct. 11, 1949

INVENTOR
HENRY J. HERSEY, JR.
BY
James D. Bock
ATTORNEY

UNITED STATES PATENT OFFICE 2,551,126

DUST FILTER

Henry J. Hersey, Jr., Chatham, N. J.

Application October 11, 1949, Serial No. 120,680

7 Claims. (Cl. 183—61)

The present invention relates to dust filters, more particularly to improvements in dust filters of the general type disclosed in my co-pending application S. N. 683,018, filed July 12, 1946, now Patent No. 2,495,635, granted January 24, 1950. In said co-pending application there is disclosed a dust filter wherein a porous flexible filter medium, preferably made of felt or felted material having interstices much smaller than the thickness thereof, is supported in a generally cylindrical shape. Dust laden gas is introduced on one side of the filter medium at a gaseous pressure higher than that on the other side whereby the solid particles of the dust laden gas will be deposited upon the high pressure side of the filter medium. A reverse-jet cleaning device is provided in order to clean the filter medium or to maintain the accumulated layer of solid particles thereon at a thickness which lies within a predetermined range best calculated to produce efficient operation from the standpoint of ability to handle adequate quantities of dust laden gas as well as from the standpoint of ability to retain exceedingly fine particles. The reverse-jet cleaning device is so arranged as to direct a highly concentrated jet of high pressure air or other gas from the low pressure side of the filter medium and through the filter medium so as to dislodge solid particles from the high pressure side thereof for gravitation to a suitable hopper at the bottom of the filter.

The present invention provides specific improvements in reverse-jet cleaning apparatus, particularly in the construction and mounting of the blow ring forming a part of such apparatus. The present invention also provides a structure particularly useful in connection with the cleaning of a plurality of filter units.

According to the present invention the blow ring which encircles the cylindrical filter medium is made in a plurality of relatively movable parts which are independently biased into firm engagement with the surface of the filter medium irrespective of variations in shape, size and alignment thereof and with sufficient pressure to bend the filter medium inwardly against the pressure of the dust laden gas at the point of operation of the reverse jet of cleaning air. The invention also provides an unusually flexible, floating mounting means for the blow rings which is useful not only with the multi-part blow rings disclosed herein, but also with blow rings of other types including the general type disclosed in said co-pending application.

It is an object of the present invention to provide apparatus of the type disclosed above. Other and further objects will become apparent upon a consideration of the present detailed description taken in connection with the drawings accompanying and forming a part of this specification.

In the drawings:

Fig. 1 is a fragmentary elevational view of a dust filter embodying the improvements of the present invention. The dust filter therein shown may be similar to or identical with that illustrated in full detail in my co-pending application S. N. 683,018, now Patent No. 2,495,635 aforesaid;

Figure 1:
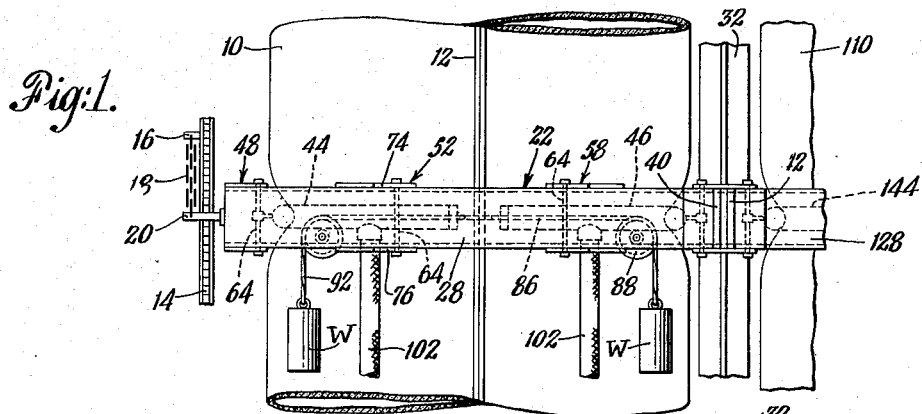

Referring now to the drawings, there is shown a generally cylindrical filter medium 10 which preferably is made of felt or other felted material having interstices much smaller than the thickness thereof. The filter medium 10 may be assembled in tubular form as by stitching along one or more face-to-face seams 12 and it may be supported in generally cylindrical form upon the upper and lower parts (not shown) of a filter device similar to or identical with that shown in said co-pending application S. N. 683,018 (now Patent No. 2,495,635).

Figure 2:
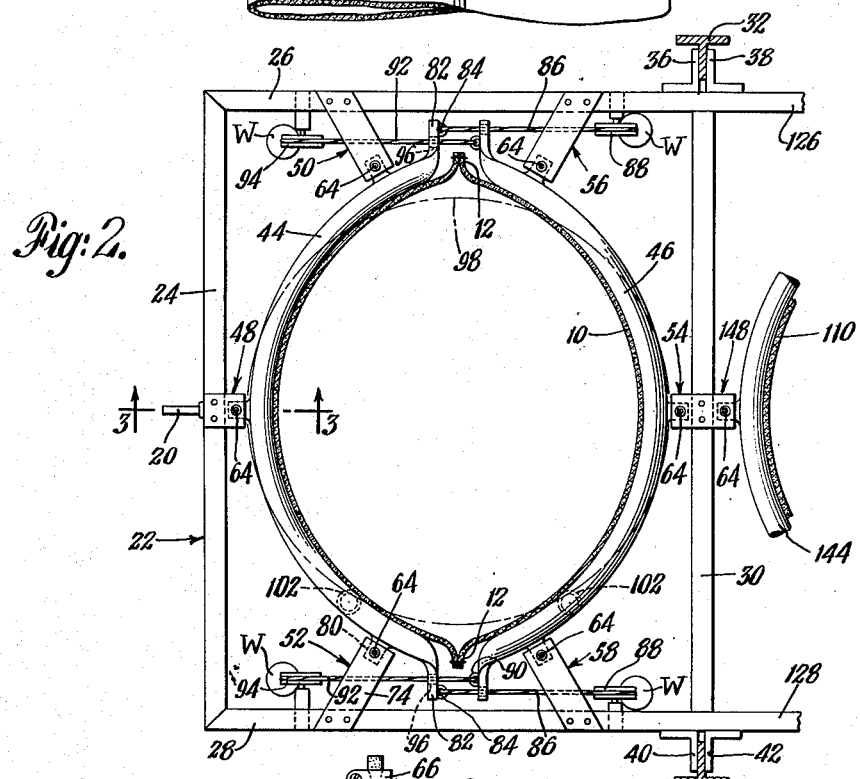
Fig. 2 is a fragmentary plan view of the device shown in Fig. 1.

Dust laden gas is supplied to the inner side of the cylindrical filter medium 10 under a gaseous pressure greater than that existing on the outer side thereof whereby the solids suspended in said gas will be deposited upon the inner surface of the filter medium 10 as viewed in said Figs. 1 and 2.

For removing the layer of solids or a portion thereof to maintain the filter in condition for operation at maximum efficiency, a reverse-jet cleaning device is associated therewith in such manner as to project a jet of high pressure cleaning gas through the filter medium in a direction opposite to that of the flow of gas incident to the normal operation of the filter. This apparatus is arranged to move to and fro vertically of the filter medium 10 in order that the entire inner or high pressure surface of the filter medium 10 will progressively be subjected to the cleaning operation. To this end the filter includes apparatus (not shown) for continuously or intermittently driving one or more vertically disposed sprocket chains. One of the links of said chain 14 may be provided with an arm 16 which is connected through a flexible chain 18 with an arm 20 secured to a framework 22 which carries the blow ring equipment forming a part of the reverse jet cleaning apparatus. Movement of the chains 14 is effective, through the connections just described, to carry the framework 22 to and fro vertically of the filter medium 10.

As shown in Figs. 1 and 2 the framework 22 defines a rectangular bay which surrounds the filter medium 10. There is also shown fragments of a second bay which surrounds a second filter medium 110, only a portion of which is shown. It will be understood that the framework 22 may be extended in either direction to include any desired number of bays for surrounding as many filter mediums as may be necessary in any given installation. Installations containing four, six or more bays for the cleaning of corresponding numbers of filter units may thus be provided simply by duplicating the apparatus to be described in detail herein.

The framework 22 includes at least four members 24, 26, 28 and 30 which may be channel sections as illustrated or may be any other suitable structural shape. The members 26 and 28, for example, may be extended as indicated at 126 and 128 to enclose a second bay as shown or additional bays if so desired. The member 30 may serve not only as a portion of the complete bay illustrated, but also as a part of the additional bay partially shown to the right thereof in Fig. 2.

The framework 22 may be provided with guiding means for maintaining it in a uniform vertical path of travel. For example, there are shown T sections 32 and 34 which are secured to the floor or other permanent structure (not shown) and which slidably enter between appropriately spaced angular sections 36, 38, 40 and 42 secured at appropriate points upon the framework 22.

Vertical motion of the framework 22 relative to the filter medium 10 and other filter mediums such as 110, if present, may be imparted thereto in opposite directions as by permitting the arm 16 to pass around sprockets at the upper and lower end of the filter as shown in said co-pending application or by providing a simple reversible driving mechanism for the chains 14 such, for example, as an automatically reversible electric motor.

The apparatus so far described is either shown in greater detail in said co-pending application or is of an obvious nature, and in either event does not form a specific part of the present invention except insofar as cooperation thereof with the features of the present invention is essential.

The framework 22 carries for free floating movement therewith a blow ring for each of the filter mediums 10, 110, etc. in any given installation. The floating support is an essential feature of the present invention inasmuch as the framework 22 is guided for vertical movement in a fixed path, whereas the filter medium or filter mediums may not be precisely uniform in cross section either as to size or shape, and furthermore they may not be precisely in vertical parallelism with the fixed path of movement of the framework 22.

As shown in the drawings the blow ring associated with the filter medium 10 comprises two substantially semi-circular sections 44 and 46 independently supported so as substantially to surround the filter medium 10. A similar section 144 is shown associated with the filter medium 110, and it will be understood that the construction and support of the section 144 and any other sections included in any given installation may be identical with the sections 44 and 46.

The section 44 is floatingly supported upon the framework 22 by a plurality of supporting units indicated generally at 48, 50 and 52. Respectively identical units 54, 56 and 58 are provided for the blow ring section 46 and it will be understood that other respectively identical units such as 148 will be provided to support the blow ring section 144 as well as all other blow ring sections in the installation.

Figure 3:
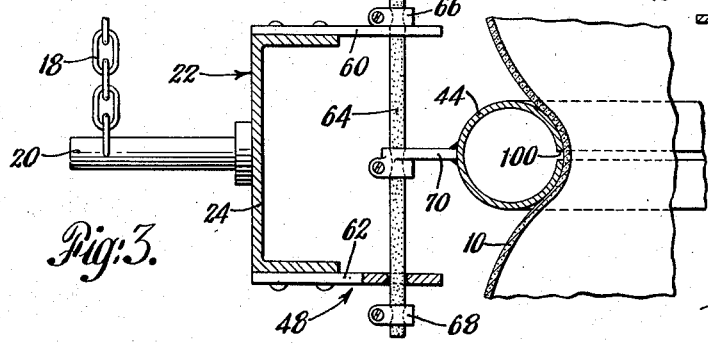
Fig. 3 is a section along the line 3—3 in Fig. 2.

The unit 48 will be described first inasmuch as it is shown in the detailed view Fig. 3. The unit 48 includes a plate 60 secured to the upper flange of the section 24 and a plate 62 secured to the lower flange thereof. The plates 60 and 62 extend inwardly of the bay toward the filter medium 10 for an appropriate distance, and they are perforated in vertical alignment so as to receive a vertically disposed flexible resilient element 64. Preferably the element 64 is made of rubber or similar material having a round, square or other desirable cross section. The element 64 not only may be flexible and resilient in the sense of permitting bending, but also in the sense of permitting elongation and contraction so that a relatively wide range of floating movement of a part supported thereby may occur. The element 64 is provided with a clamp 66 secured to the end thereof which extends above the plate 60. The clamp 66 is larger than the perforation in the plate 60 and therefore supports the element 64 in the position shown in Fig. 3. A similar clamp 68 is secured to the element 64 on the end thereof which extends below the plate 62 so that the element 64 is securely fastened to the framework 22. As shown in Fig. 3 the clamp 68 is spaced from the plate 62 to permit a certain amount of horizontal displacement of the element 64 without elongation. This has been found desirable in connection with the specific blow ring construction herein disclosed, but in many installations it will be possible to place the clamp 68 in engagement with the lower plate 62 and it may be desirable in some cases to pre-stress the element 64 as by elongating it and securing the clamps 66 and 68 while the element 64 is elongated.

The blow ring section 44 has secured thereto, as by welding, an arm 70 which is provided at its free end with a clamp 72 which may be tightened upon the element 64 preferably about midway between the upper and lower plates 66 and 68. In this manner the blow ring section 44 is supported by that portion of the element 64 which extends upwardly from the clamp 72 to the upper plate 60. From a consideration of the structure just described it will be apparent that the blow ring section 44 may partake of extensive movement in generally horizontal directions relative to the framework 22. The movement will be relatively free of restraint by the element 64 until such time as the degree of movement is so great as to require substantial stretching of the element 64.

The supporting units 50 and 52 are identical with the unit 48 except that the upper and lower supporting plates, 74 and 76 in the unit 52 for example, are appropriately differently shaped so as to position the flexible resilient element 64 thereof in proper position for cooperation with the arm 80. The other supporting units 54, 56, 58 and 148 are similarly constructed and each includes a flexible resilient supporting element.

It will be apparent that the supporting structure just described will permit the blow ring supported thereby to float relative to the framework 22 in generally horizontal and vertical directions. The blow ring may thus adapt itself to such variations in alignment and shape of the filter medium as ordinarily occur in industrial installations. The supporting structure just described may be used to support a one-piece circular blow ring of the type shown in said co-pending application or it may be used, as illustrated herein, to support the separate sections of a multi-part blow ring. If used in the latter combination the multi-part blow ring is thus enabled to adapt itself not only to those variations in alignment and shape which are within the capacity of a one-piece blow ring supported as taught herein, but also to relatively major changes in cross sectional shape and size as are frequently encountered in commercial installations handling large volumes of heavily dust laden gas.

As disclosed in said co-pending application the diameter of the inner or slotted surface of the one-piece blow ring may be somewhat smaller than the outside diameter of the cylindrical filter element with which the blow ring is used. Under these conditions when the filter medium is inflated by the pressure of dust laden gas therein, the blow ring constricts the filter medium locally, bending the filter medium around the inner surface of the blow ring. This serves to elongate the high pressure side of the filter medium upon which the solids are deposited and such elongation opens the interstices and facilitates the dislodgment of solid material therefrom by the jet of air from the blow ring. It will be seen that the relation between the diameter of the blow ring and that of the filter medium must be rather carefully chosen to achieve the desired result while at the same time avoiding too great a constriction of the filter medium which might result in wrinkling or undue friction. According to the present invention wherein the blow ring comprises two semi-circular sections 44 and 46 the sections may be arranged to encircle the filter medium and may be independently pressed into contact therewith to secure exactly the amount of deflection or bending of the filter medium which may be desired.

As shown in Figs. 1 through 3 the blow ring section 44 may be made of tubing of appropriate diameter which is bent into generally semi-circular form. If preferred, as shown, the radius of curvature of the bent tube may be larger than the radius of curvature of the filter medium and in that case the section 44 will take the form of an incomplete semi-circle. The ends of the tubing may be flattened to close the tubing and may be bent more or less radially outwardly as shown at 82. The ends 82 are of sufficient length to project well away from the body of the filter medium 10 and to clear the side seams 12. The ends 82 are supplied with eyes 84 to which are secured the ends of flexible cables 86 running freely over pulleys 88 mounted on the framework 22. Weights W are carried at the lower ends of the flexible cables 86 and serve to urge the blow ring section 44 to the right as viewed in Figs. 1 through 3.

The blow ring section 46 is similarly provided with eyes 90, cables 92, pulleys 94 and weights W for the same purpose. The flattened ends 82 of the blow ring section 44 may be provided with perforations 96 to permit the free passage of the cable 92 and similar perforations are provided in the flattened ends of the blow ring section 46 for permitting the free passage of the cables 86.

It will be apparent therefore that the blow ring sections 44 and 46 are constantly urged into contact with the outer or low pressure surface of the filter medium 10 by the weights W. Similar apparatus is provided for the blow ring section 144 and any other blow ring sections which may be present in an installation. When inflated by dust laden gas the filter medium 10 will tend to assume a truly cylindrical cross section as indicated by the broken line 98 in Fig. 2. The blow ring sections 44 and 46 will press local areas of the filter medium inwardly from opposite directions and if of greater radius than the filter medium will make it assume a somewhat elliptical cross section as shown in full lines in said Fig. 2. Each blow ring section is provided with an elongated orifice or slot 100 which extends substantially throughout the length of the inner surface of each section which is in contact with the filter medium. Air or other gas is supplied to the blow ring sections through flexible hoses 102 communicating with the interior of the sections and connected with a blower preferably of the positive pressure type (not shown) as illustrated in said co-pending application S. N. 683,018, now Patent No. 2,495,635. The high pressure air or other gas thus supplied to the blow ring sections is emitted from the orifices 100 for passage through the filter medium 10 to dislodge the accumulated solids from the inner or high pressure surface thereof. A similar air supply is provided for the blow ring section 144 and any other blow ring sections in the installation.

In operation the framework 22 is reciprocated vertically to carry the blow ring sections to and fro vertically of the filter mediums with which they are in contact, and as variations in shape or size of the filter mediums may be encountered, the blow ring sections may independently follow such variations while maintaining constant pressure upon the filter medium as a result of the effect of gravity upon the weights W. The weights W may be varied to give most effective and practical degree of indentation of the filter medium. Movement of the blow ring sections relative to the framework 22 is permitted by the flexing and stretching of the supporting elements 64 or 78 within the supporting units 50, 52, et seq. described above.

From a consideration of the above description it is believed to be apparent that there is provided an apparatus which achieves the objects of the present invention. The advantages of the present invention are believed to be readily apparent. It is particularly to be noted that the present invention makes it possible to provide a single driving means for raising and lowering a plurality of reverse jet filter cleaning devices associated with a plurality of filter units while at the same time insuring adequate, effective and substantially uniform contact pressure between the blow rings and the filter mediums in all of such units. The present invention makes it possible to erect a multiple unit filter and to equip it with an appropriate number of filter mediums without the necessity for placing all of the mediums in precise vertical parallelism and without the necessity for holding the cross sectional diameter of the filter mediums to extremely close tolerance.

The language used is to be taken in a descriptive rather than in a limiting sense and the scope of the invention is that established by the appended claims.

What is claimed is:

1. In a dust filter, the combination of a porous flexible cylindrical filter medium for accumulating on one side thereof solid particles from a dust laden gas, a curved hollow member having an orifice therein in contact with the opposite side of said filter medium in a plane generally transverse to the axis of said cylindrical filter medium for projecting a jet of gas through said filter medium to dislodge accumulated solids from said first-named side, and means for moving said hollow member relative to said filter medium in directions substantially parallel with the axis thereof for operation upon an extensive area of said filter medium, said moving means including a frame surrounding said filter medium movable in a fixed path generally parallel with the axis of said cylindrical filter medium, and stretchable rubber links connecting said hollow member with said frame for movement therewith and for limited floating movement relative thereto.

2. In a dust filter, the combination of a porous flexible filter medium of generally cylindrical conformation for accumulating on the inner side thereof solid particles from a dust laden gas, a pair of curved hollow members of generally semi-circular shape arranged in diametrically opposed positions with respect to said cylindrical filter medium whereby substantially to encircle said filter medium, each of said hollow members having an elongated orifice for projecting a jet of gas through said filter medium to dislodge accumulated solids from said inner side, means for moving said hollow members jointly to and fro in directions substantially parallel with the axis of said cylindrical filter medium for operation upon an extensive area thereof, and means associated with each of said hollow members for yieldably urging it into engagement with said outer side of said filter medium.

3. In a dust filter, the combination of a porous flexible filter medium of generally cylindrical conformation for accumulating on the inner side thereof solid particles from a dust laden gas, a pair of curved hollow members of generally semi-circular shape arranged in diametrically opposed positions with respect to said cylindrical filter medium whereby substantially to encircle said filter medium, each of said hollow members having an elongated orifice for projecting a jet of gas through said filter medium to dislodge accumulated solids from said inner side, means for moving said hollow members jointly to and fro in directions substantially parallel with the axis of said cylindrical filter medium for operation upon an extensive area thereof, and a weight connected with each of said hollow members for yieldably urging it into engagement with said outer side of said filter medium.

4. In a dust filter, the combination of a porous flexible filter medium of generally cylindrical conformation for accumulating on the inner side thereof solid particles from a dust laden gas, a pair of curved hollow members of generally semi-circular shape arranged in diametrically opposed positions with respect to said cylindrical filter medium whereby substantially to encircle said filter medium, each of said hollow members having an elongated orifice for projecting a jet of gas through said filter medium to dislodge accumulated solids from said inner side, a frame surrounding said filter medium movable in a fixed path generally parallel with the axis of said cylindrical filter medium, resilient means connecting each of said hollow members with said frame for movement therewith and for limited floating movement relative thereto for operation upon an extensive area of said filter medium, and means associated with each of said hollow members for yieldably urging it into engagement with said outer side of said filter medium.

5. In a dust filter, the combination of a porous flexible filter medium of generally cylindrical conformation for accumulating on the inner side thereof solid particles from a dust laden gas, a pair of curved hollow members of generally semi-circular shape arranged in diametrically opposed positions with respect to said cylindrical filter medium whereby substantially to encircle said filter medium, each of said hollow members having an elongated orifice for projecting a jet of gas through said filter medium to dislodge accumulated solids from said inner side, a frame surrounding said filter medium movable in a fixed path generally parallel with the axis of said cylindrical filter medium, resilient means connecting each of said hollow members with said frame for movement therewith and for limited floating movement relative thereto for operation upon an extensive area of said filter medium, and a weight connected with each of said hollow members for yieldably urging it into engagement with said outer side of said filter medium.

6. In a dust filter, the combination of a porous flexible filter medium of generally cylindrical conformation for accumulating on the inner side thereof solid particles from a dust laden gas, a pair of curved hollow members of generally semi-circular shape and having a radius of curvature greater than that of said cylindrical filter medium arranged in diametrically opposed positions with respect to said cylindrical filter medium whereby substantially to encircle said filter medium, each of said hollow members having an elongated orifice for projecting a jet of gas through said filter medium to dislodge accumulated solids from said inner side, means for moving said hollow members jointly to and fro in directions substantially parallel with the axis of said cylindrical filter medium for operation upon an extensive area thereof, and means associated with each of said hollow members for yieldably urging it into engagement with said outer side of said filter medium to press adjacent portions of said filter medium inwardly into generally elliptical shape.

7. In a dust filter, the combination of a porous flexible cylindrical filter medium for accumulating upon the inner side thereof solid particles from a dust laden gas, a reverse jet cleaning device substantially encircling said filter medium comprising a plurality of separate hollow curved sections independently urged into yielding engagement with the outer side of said filter medium, each of said sections having an orifice for projecting a jet of gas through said filter medium to dislodge accumulated solids from said inner side, and means for moving said cleaning device relative to said filter medium for operation upon an extensive area thereof.

HENRY J. HERSEY, Jr.

REFERENCES CITED

The following references are of record in the file of this patent:

UNITED STATES PATENTS

| Number | Name | Date |
| --- | --- | --- |
| 1,321,490 | Sweetland | Nov. 11, 1919 |
| 1,944,267 | Rathbun | Jan. 23, 1934 |
| 1,944,268 | Rathbun | Jan. 23, 1934 |
| 2,476,942 | Arnold | July 19, 1949 |